United States Patent
Robles-Kelly et al.

(10) Patent No.: US 9,754,181 B2
(45) Date of Patent: Sep. 5, 2017

(54) DETERMINING COLOR VALUES IN HYPERSPECTRAL OR MULTISPECTRAL IMAGES

(71) Applicant: NATIONAL ICT AUSTRALIA LIMITIED, Eveleigh, NSW (AU)

(72) Inventors: Antonio Robles-Kelly, Eveleigh (AU); Cong Phuoc Huynh, Eveleigh (AU); Lin Gu, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 62 days.

(21) Appl. No.: 14/355,796

(22) PCT Filed: Nov. 2, 2012

(86) PCT No.: PCT/AU2012/001352
§ 371 (c)(1),
(2) Date: May 1, 2014

(87) PCT Pub. No.: WO2013/063655
PCT Pub. Date: May 10, 2013

(65) Prior Publication Data
US 2015/0030244 A1    Jan. 29, 2015

(30) Foreign Application Priority Data
Nov. 4, 2011 (AU) .............................. 2011904583

(51) Int. Cl.
*G06K 9/46* (2006.01)
*G06K 9/52* (2006.01)
(Continued)

(52) U.S. Cl.
CPC ............. *G06K 9/4652* (2013.01); *G06K 9/52* (2013.01); *G06T 11/001* (2013.01);
(Continued)

(58) Field of Classification Search
CPC ...... G06K 9/4652; G06K 9/52; G06T 11/001; H04N 1/6058; H04N 1/6086; H04N 1/622
See application file for complete search history.

(56) References Cited

U.S. PATENT DOCUMENTS

2002/0012461 A1   1/2002   MacKinnon et al.
2004/0017586 A1   1/2004   Nichogi
(Continued)

FOREIGN PATENT DOCUMENTS

EP   1 119 189 A1   7/2001

OTHER PUBLICATIONS

Hashimoto, Noriaki, et al. "Multispectral image enhancement for effective visualization." Optics express 19.10 (2011): 9315-9329.*
(Continued)

Primary Examiner — Stephen R Koziol
Assistant Examiner — Menatoallah Youssef

(57) ABSTRACT

The disclosure concerns processing of electronic images, such as hyperspectral or multispectral images (302) to determine an output color value for a component spectrum of a decomposed multispectral or hyperspectral image. A processor (120) first determines or accesses the component spectrum and a first color value for the component spectrum and receives an input color value for a pixel location in the image, wherein the component spectrum contributes to the pixel. The processor (120) then determines the output color value for the component spectrum based on the first color value for the component spectrum, the input color value and a utility score and stores the output color value for the component spectrum on a datastore (118). It is an advantage that the processor (120) receives a color value for a pixel
(Continued)

location but the output color value is not exactly the received color value but one that is determined based on a utility score.

23 Claims, 4 Drawing Sheets

(51) Int. Cl.
*G06T 11/00* (2006.01)
*H04N 1/60* (2006.01)
*H04N 1/62* (2006.01)

(52) U.S. Cl.
CPC ......... *H04N 1/6058* (2013.01); *H04N 1/6086* (2013.01); *H04N 1/622* (2013.01)

(56) References Cited

U.S. PATENT DOCUMENTS

2004/0105261 A1* 6/2004 Ducharme ......... H05B 33/0863
362/231
2009/0128649 A1 5/2009 Osorio et al.
2010/0179934 A1 7/2010 Howley et al.

OTHER PUBLICATIONS

Kim, Seon Joo, et al. "Interactive visualization of hyperspectral images of historical documents." Visualization and Computer Graphics, IEEE Transactions on 16.6 (2010): 1441-1448.*
Shippert, Peg. "Introduction to hyperspectral image analysis." Online Journal of Space Communication 3 (2003).*
Basener, William F., and David W. Messinger. "Enhanced detection and visualization of anomalies in spectral imagery." SPIE Defense, Security, and Sensing. International Society for Optics and Photonics, 2009.*
Wilson, Terry, Steven K. Rogers, and Matthew Kabrisky. "Perceptual-based image fusion for hyperspectral data." Geoscience and Remote Sensing, IEEE Transactions on 35.4 (1997): 1007-1017.*
Pareja-Illeras, Rosario, et al. "Design and comparison of multi-and hyper-spectral imaging systems." European Symposium on Optics and Photonics for Defence and Security. International Society for Optics and Photonics, 2005.*
Regional and Mesoscale Meteorology Branch, Hazard Detection, Aug. 28, 2008 , CIRA,p. 1-2.*
L. Gu et al., Material-Specific User Colour Profiles from Imaging Spectroscopy Data, Computer Vision (ICCV), 2011 IEEE International Conference, 8 pages.
Anai Levin et al., Colorization using Optimization, School of Computer Science and Engineering, The Hebrew University of Jerusalem, 6 pages.
Randall B. Smith, Analyzing Hyperspectral Images, MicroImages, Inc., 2011, 40 pages.
Randall B. Smith, Introduction to Hyperspectral Images, MicroImages, Inc., 2006, 24 pages.
Adrien Bousseau et al., Optimizing Environment Maps for Material Depiction, Jun. 2011, 12 pages.
N. Salamati et al., Material-Based Object Segmentation Using Near-Infrared Information, 2010 Society for Imaging Science and Techlology, pp. 196-201.
CBN Selector 3—website http://www.cbnsystem.com/demo/—located on Sep. 7, 2011, 16 pages.
Interpreting Optical Remote Sensing Images—website http://www.crisp.nus.edu.sg/—located on Sep. 7, 2011, 12 pages.
Elli Angelopoulou, Multispectral Skin Color Modeling, IEEE 2001, pp. II-635 thru II-642.
Frederic Bonnans et al., Numerical Optimization Theoretical and Practical Aspects, Second Edition, published by Springer-Verlag Berlin Heidelberg, 1997, 494 pages.
Ritendra Datta et al., Studying Aesthetics in Photographic Images Using a Computational Approach, The Pennsylvania State University, ECCV 2006, Part III, LNCS 3953, pp. 288-301.
Cong Phuoc Huynh et al., A NURBS-Based Spectral Reflectance Descriptor with Applications in Computer Vision and Pattern Recognition, IEEE, 2008, 7 pages.
E.T. Jaynes, Information Theory and Statistical Mechanics, The Physical Review, vol. 106, No. 4, May 15, 1957, pp. 620-630.
S. Kirkpatrick et al., Optimization by Simulated Annealing, Science, New Series, vol. 220, No. 4598, May 13, 1983, pp. 671-680.
Steven A. Shafer, Using Color to Separate Reflection Components, Computer Science Department, University of Rochester, New York, TR 136 Apr. 1984, 29 pages.
W.S. Stiles et al., NPL Colour-matching Investigation: Final Report, National Physical Laboratory, Teddington, Middlesex, published online Nov. 11, 2010, 26 pages.
PCT International Search Report and Written Opinion, PCT/AU2012/001352, Australian Patent Office, dated Jan. 2013, 12 pages.
Exploring Earth-Multispectral Imaging—http://www.classzone.com/books/earth_science/terc/content/investigations/esu101/esu101page7.cfm located on Sep. 7, 2011, 2 pages.

* cited by examiner

DETERMINING COLOR VALUES IN HYPERSPECTRAL OR MULTISPECTRAL IMAGES

TECHNICAL FIELD

The disclosure concerns processing of electronic images, such as hyperspectral or multispectral images. In particular, the invention concerns, but is not limited to, methods, software and computer systems for determining a colour (color) value of an endmember or a material represented in an electronic image.

BACKGROUND ART

With digital imaging replacing film-based photography processes, the accurate capture and reproduction of colours has become more challenging. The input sources, such as digital imaging sensors, as well as the output devices, such as monitors and printers, have different colour characteristics.

The colour vision of humans is a complex process. The light is received in the human eye by three different types of cones. Each cone has a different peak wavelength, that is the wavelength with maximal sensitivity, and different distribution of the sensitivity across the light spectrum. The brain then processes the signals from the cones to create a perception of different colours.

A simplified approach to colour vision and representation is the representation of the light spectrum by the three components red (R), green (G) and blue (B). Most imaging sensors produce RGB values for the captured image. However, the sensitivity of the imaging sensors is different to the sensitivity of the human eye. In addition, most output devices such as computer monitors, cannot produce arbitrary light spectra but only mixtures of the spectra of three available colours, which again have different spectra to the sensitivity of the sensor. The influence of the sensor sensitivity, the monitor colour spectrum and the perception of the human eye need to be considered in order to produce a realistic reproduction of a captured image.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

In a first aspect there is provided a computer implemented method for determining an output colour value for a component spectrum of a decomposed multispectral or hyperspectral image, the method comprising:
  determining or accessing the component spectrum and a first colour value for the component spectrum;
  receiving an input colour value for a pixel location in the image, wherein the component spectrum contributes to the pixel;
  determining the output colour value for the component spectrum based on the first colour value for the component spectrum, the input colour value and a utility score; and
  storing the output colour value for the component spectrum on a datastore.

It is an advantage that the method receives a colour value for a pixel location but the output colour value is not exactly the received colour value but one that is determined based on a utility score.

Determining the output colour value may comprise optimising a cost function.

It is an advantage that the determination of the output colour value is optimised directed by the utility score. Any changes to the output colour value that negatively affect the utility score are penalised and the resulting colour value has a higher utility.

The input colour value may be received from a user.

The image may be decomposed into material spectra and the component spectrum may be one of the material spectra.

The method may comprise
  determining or accessing a decomposition of the material spectrum into endmember spectra; and
  determining an output colour value for each endmember spectrum based on the output colour value for the material spectrum.

The image may be decomposed into endmember spectra and the component spectrum may one of the endmember spectra.

The method may be performed, such that an output colour value for each component spectrum represented in the image is determined.

The method may comprise determining or accessing a component contribution for the pixel location and the cost function may be based on the component contribution.

The utility score may be any one or more of
  an aesthetic score;
  a score based on a predetermined scale of danger, benefit, profit or added financial or monetary value;
  enhanced visualisation of multiple images; or
  the nature of the rendering context.

The utility score may be based on a classifier.

The classifier may be any one or more of
  a quadratic discriminant;
  a support vector machine;
  a linear discriminant; or
  a logistic regressor.

The classifier may be based on one or more of
  abundance of material spectra in the image;
  most abundant component spectrum;
  second most abundant component spectrum;
  rule of thirds;
  whole image average;
  macro feature;
  domain knowledge; or
  rules and regulations pertaining the utility measure.

The utility score may be based on the contrast of the image.

The utility score may based on the hazardousness of the component spectra.

The cost function may be based on a utility score for each component spectrum.

The method may comprise accessing a library of component spectra.

The method may comprise determining or accessing illuminant spectra and illuminant contributions.

The method may comprise determining a colour value for each illuminant spectrum.

The method may comprise determining a colour value for each combination of component spectra and illuminant spectra.

The method may comprise determining for each pixel location a pixel colour value based on the output colour value for each of the component spectra and the component contributions.

It is an advantage that a colour image is created for the decomposed multispectral or hyperspectral image.

The method may comprise displaying to a user an image based on the pixel colour values.

The method may comprise initialising the first colour value for the component spectrum with a default colour.

In a second aspect there is provided software, that when installed on a computer causes the computer to perform the method of any one or more of the claims 1 to 22.

In a third aspect there is provided a computer system for determining an output colour value for a component spectrum of a decomposed multispectral or hyperspectral image, the system comprising:

a processor to determine or access the component spectrum and a first colour value for the component spectrum; to receive an input colour value for a pixel location in the image wherein the component spectrum contributes to the pixel; to determine the output colour value for the component spectrum based on the first colour value for the component spectrum, the input colour value and a utility score; and to store the output colour value for the component spectrum on a datastore.

The computer system may comprise a port to receive wavelength indexed multispectral image data and a storage to store the image data, the component spectrum and the output colour value.

Optional features described of any aspect, where appropriate, similarly apply to the other aspects also described here.

BRIEF DESCRIPTION OF DRAWINGS

An example will be described with reference to

BEST MODE FOR CARRYING OUT THE INVENTION

Figure 1A:
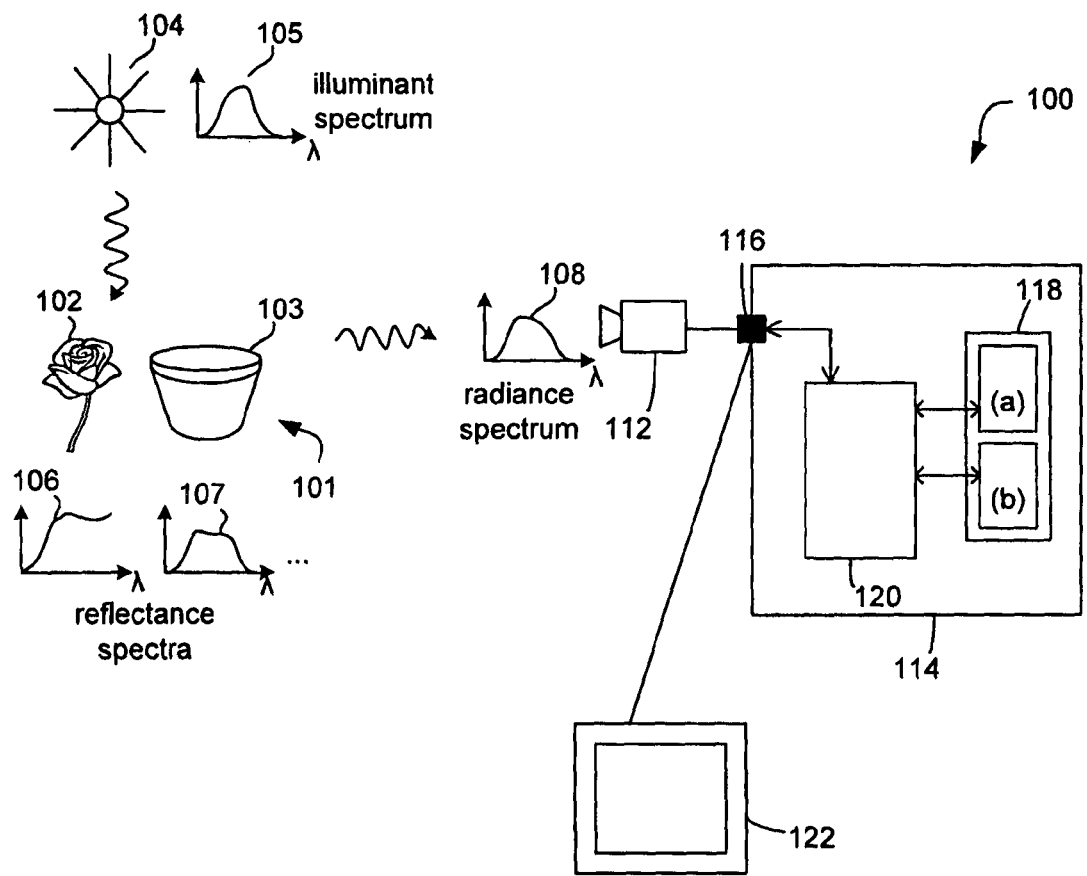
FIG. 1a illustrates a computer system for determining a colour profile.

FIG. 1a illustrates a computer system 100 for determining a colour value for each component of a decomposed image of a scene 101. The colour value may be an RGB value, such as (255, 0, 0) for red, or an HSV value. In one example, the component is a material, that is the scene is decomposed into a linear combination of materials and illuminants and the computer system 100 determines a colour value for each material and for each illuminant. In a different example the component is an endmember, that is each material is further decomposed into a linear combination of endmembers and the computer system 100 determines a colour for each endmember instead of each material.

The difference between materials and endmembers becomes relevant where there are a number of materials and these materials can be expressed as endmembers. For instance, a set of materials, such as pills, of different kinds that can be expressed as a combination of endmembers, such as vitamins, minerals, antibiotics. The computer system 100 assigns a mapping per material (pill), that is consistent with that yielded by the linear combination of the chemicals in the pill (vitamins, minerals, etc.). The computer system 100 defines, in one example, a mapping per material or, in another example, a mapping per endmember and then express the material as a linear contribution of these endmembers.

In a different example the computer system 100 determines a colour value for each combination of materials or endmembers and illuminants.

In the example of FIG. 1 the scene comprises a rose 102 and a flower pot 103 illuminated by the sun 104 having illuminant spectrum 105. The term reflectance generally refer to the fraction of incident electromagnetic power that is reflected. Object reflectance, material reflectance and endmember reflectance refer to the fraction of power reflected from an object, a material and an endmember, respectively. Since the reflectance is dependent on the wavelength, each reflectance is represented by a reflectance spectrum.

Throughout this specification, unless stated otherwise, where reflectance spectrum is used in singular form it refers to object reflectance and where reflectance spectra is used, that is in plural form, it refers to material or endmember spectra. In the case of the plural form, typically either of material or endmember spectra may be chosen to perform that part of the method.

The objects in the scene 101 comprise multiple different materials and each material has a material reflectance spectrum. Two material reflectance spectra 106 and 107 for the blossom and the pot respectively are depicted.

Computer system 100 comprises a sensor 112 and a computer 114. In this example the sensor 112 is a hyperspectral or multispectral sensor that is able to capture an image of the scene 101. The computer 114 comprises a program memory 118(a), a data memory 118(b) and a processor 120.

When the light from the illuminant 104 hits the objects, the illuminant spectrum 105 is multiplied by the respective material reflectance spectra 106 and 107. The resulting spectra are superposed and reach the sensor 102 as a radiance spectrum 108. The sensor has a number of pixels, such as one million, and captures for each pixel location a separate sampled version of the radiance spectrum.

In one example the computer system is integrated into a handheld device such as a consumer camera and the scene 101 may be any scene on the earth, such as a tourist attraction or a person. The scene may also be illuminated by multiple artificial light sources, such as fluorescent lamps. The sensor 112 may have a number of bands that balances computational costs with accuracy. The sensor 112 may have as low as four bands and as high as hundreds.

The computer 114 receives images from the sensor 112, which are stored in local data memory 118(b) by processor 120. The processor 120 uses software stored in program memory 118(a) to perform the method shown in FIG. 2. In this sense the processor 120 performs the method of determining colour values for endmembers or materials and illuminants. The processor 120 determines material reflectance spectra and illumination spectra and decomposes the images into a combination of the material reflectance spectra weighted by material association probabilities. As mentioned above, in some examples, the computer further decomposes the images into endmember spectra weighted by endmember association probabilities.

In another example, the processor accesses predefined material or endmember reflectance spectra and predefined illumination spectra from a material or endmember library and an illumination library, respectively. These libraries are stored on data memory 118(b). In one example the endmember library consists of 297 reflectance spectra acquired using a Stellar-Net spectrometer. The endmember spectra are sampled at a spectral resolution of 1 nm in the interval [430 nm, 720 nm], that is the visible range, and comprise nine categories, including cloth, different kinds of paint, human skin, leaves, metals, papers of different colours, plastic, porcelain and wood types.

The canonical illuminant library is acquired with similar settings and consists of four light sources (tungsten, incandescent, fluorescent and sunlight). The spectra for the end members and canonical light sources are normalised so that the integrated reflectance across the visible range is unity. The local storage 118(b) stores 77 multispectral images representing three categories (landscapes, people and still life) acquired under a wide variety of lighting conditions spanning from outdoor settings to indoor locations. The imagery is composed of spectra sampled at intervals of 10 nm in the range between 430 nm and 650 nm, that is 23 bands.

To normalise the spectral images and the reflectance spectra to the same spectral resolution, the B-Spline representation in [4] is employed to re-interpolate the endmember reflectance spectra and canonical light power spectra at 27, 36, 45, 54, 63 and 72 equally spaced wavelengths in the 430-720 nm region, yielding libraries of spectra sampled at between 4 nm and 11 nm steps. Next, from these libraries are selected a number of endmembers equal to the number of sampling bands. From the 297 spectra in the initial library, those are selected that yield the lowest reconstruction error following a down-sampling operation on them so as to arrive at the same spectral resolution as the spectral images. For the imagery, the pixel spectra are up-sampled to achieve the spectral resolution corresponding to the endmember library size. Note that this is important since otherwise the problem of recovering mixture coefficients may become under-constrained and has trivial or non-unique solutions for $\rho_{m,v}$.

A reconstruction error is the error between the pseudo-colour imagery computed using the colorimetric standard and that yielded by the method described below. This error is monotonically decreasing with respect to the number of endmember spectra used. As the endmember library increases in size, the reduction in error becomes less apparent. This suggests a trade-off between complexity and performance. In one example the endmember library comprises 54 spectra and the number of end members per object material is 4.

It is noted that no libraries are necessary for the method to perform. If no libraries are available, the proposed method determines the reflectance spectra and illumination spectra as described further below. The result is a decomposed representation comprising reflectance spectra, that is material or endmember reflectance spectra, illumination spectra and respective contributions for each pixel.

The processor 120 stores the decomposed representation instead of or in addition to the originally stored image data in data memory 118(b). For storing the illumination spectrum, the endmembers or any other spectrum the computer may employ the method described in WO 2009/152583 "Compact Representation of a Reflectance Spectrum" which is incorporated herein by reference.

The software provides a user interface 122 that can be presented to the user on a touch screen 122. In most examples, the user interface 122 accepts RGB data from the processor 120 to be displayed to the user. However, the proposed method is not limited to a certain number of colour channels and the acronym RGB may be replaced by any number of different colour channels accepted by the user interface 122. The processor 120 converts the decomposed image data into RGB values and sends this data to the user interface 122. The user interface 122 displays to the user the RGB image data. The processor 120 may access a default colour profile, that is a mapping of the decomposed image data to RGB colour values, stored on memory 118(b). The user interface accepts input from the user, such as colour values for certain pixel locations. Upon receiving such user input, the processor 120 optimises the colour profile, converts the image data to RGB using the updated colour profile and sends the RGB data to the user interface 112.

In this example the memory 118(b) is local to the computer 114, but alternatively could be remote to the computer 114.

The processor 120 solves the following problem. A multispectral or hyperspectral image with the spatial domain $\mathcal{I}$ consisting of wavelength-indexed radiance spectra in the visible spectrum is captured by sensor 112. The aim of computation is the recovery of a colour image which corresponds to the input imagery where the RGB colour of the materials in the scene is determined by user input. This is achieved using two libraries. The first of these is given by the set S of primordial materials or endmembers which account for object materials in the scene. These end members can be any man-made or natural materials such as plastic, metals and skin.

The second library includes "canonical" illuminant power spectra corresponding to light sources which commonly occur in real world environments. Similarly to the endmembers above, these are lights that can be viewed as widespread in natural and man-made environments, such as sunlight, neon tubes and tungsten lighting. To each of the end members or canonical light sources corresponds a colour mapping function that yields a tristimulus RGB value for each of the entries in the libraries.

To recover the colour mappings and to provide a means to their Computation the processor employs the dichromatic model introduced by Shafer [7]. The model decomposes the scene radiance $I(\lambda,v)$ at pixel $v$ and wavelength $\lambda$ into a diffuse and a specular component as follows.

$$I(\lambda,v)=L(\lambda)(g(v)S(\lambda,v)+k(v)) \qquad (1)$$

where $L(\cdot)$ is the illuminant power spectrum, $S(\lambda, v)$ is the object reflectance, the shading factor $g(v)$ governs the proportion of diffuse light reflected from the object and the factor $k(v)$ models surface irregularities that cause specularities in the scene.

Once the image data is decomposed into endmembers S and illuminant spectra L, equation (1) is used to generate the RGB values from the decomposed image data. The image radiance is expressed using the mixture coefficient $\rho_{m,v}$ of the material m in the composition of the pixel v and the mixture coefficient $\alpha_l$ of the canonical illuminant l, as follows:

$$I_c(v) = \left(\sum_{\ell=1}^{M} \alpha_\ell g_c(L_\ell(\cdot))\right)\left(g(v)\sum_{m=1}^{N} \rho_{m,v} f_c(S_m(\cdot)) + k(v)\right) \qquad (2)$$

where c∈{R,G,B} $S_m(\cdot)$ is the vectorial representation of the reflectance spectrum of the endmember with the index m in the material library S, $L_l$ is the power spectrum of the l-th entry in the library of M canonical illuminants and $g_c$ and $f_c$ are the colour mapping functions that assign a tristimulus to each combination of canonical illuminant power and end member reflectance. $g_c$ and $f_c$ together are referred to as colour profile.

Figure 1B:
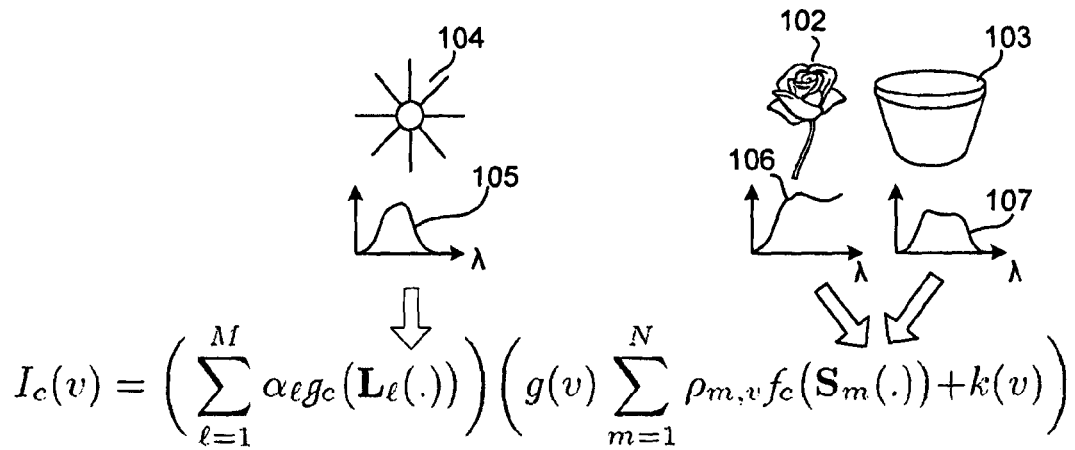
FIG. 1b illustrates contributions to the radiance.

FIG. 1b illustrates the contribution of the illumination spectrum 105 and the endmember spectra 106 and 107 to the radiance in equation (2).

In a different example, equation (2) is replaced by $$I_c(v) = g(v) \sum_l \sum_m \alpha_l \rho_{m,v} g_c(L_l(\cdot)) f_c(S_m(\cdot)) + k(v) \sum_l \alpha_l g_c(L_l(\cdot)) \quad (3)$$

which can be further expressed as follows $$I_c(v) = g(v) \sum_l \sum_m \beta_{l,m,v} p_c(L_l(\cdot), S_m(\cdot)) + k(v) \sum_l \alpha_l g_c(L_i(\cdot)) \quad (4)$$

where $$\beta_{m,v,l} = \alpha_l \rho_{m,v}$$

$$p_c(L_l(\cdot), S_m(\cdot)) = g_c(L_l(\cdot)) f_c(S_m(\cdot))$$

The difference between equations (2) and (4) is that in equation (2) each endmember and each illuminant has one individual colour mapping function. In equation (4) each combination of endmembers and illuminants has one colour mapping function.

Figure 2:
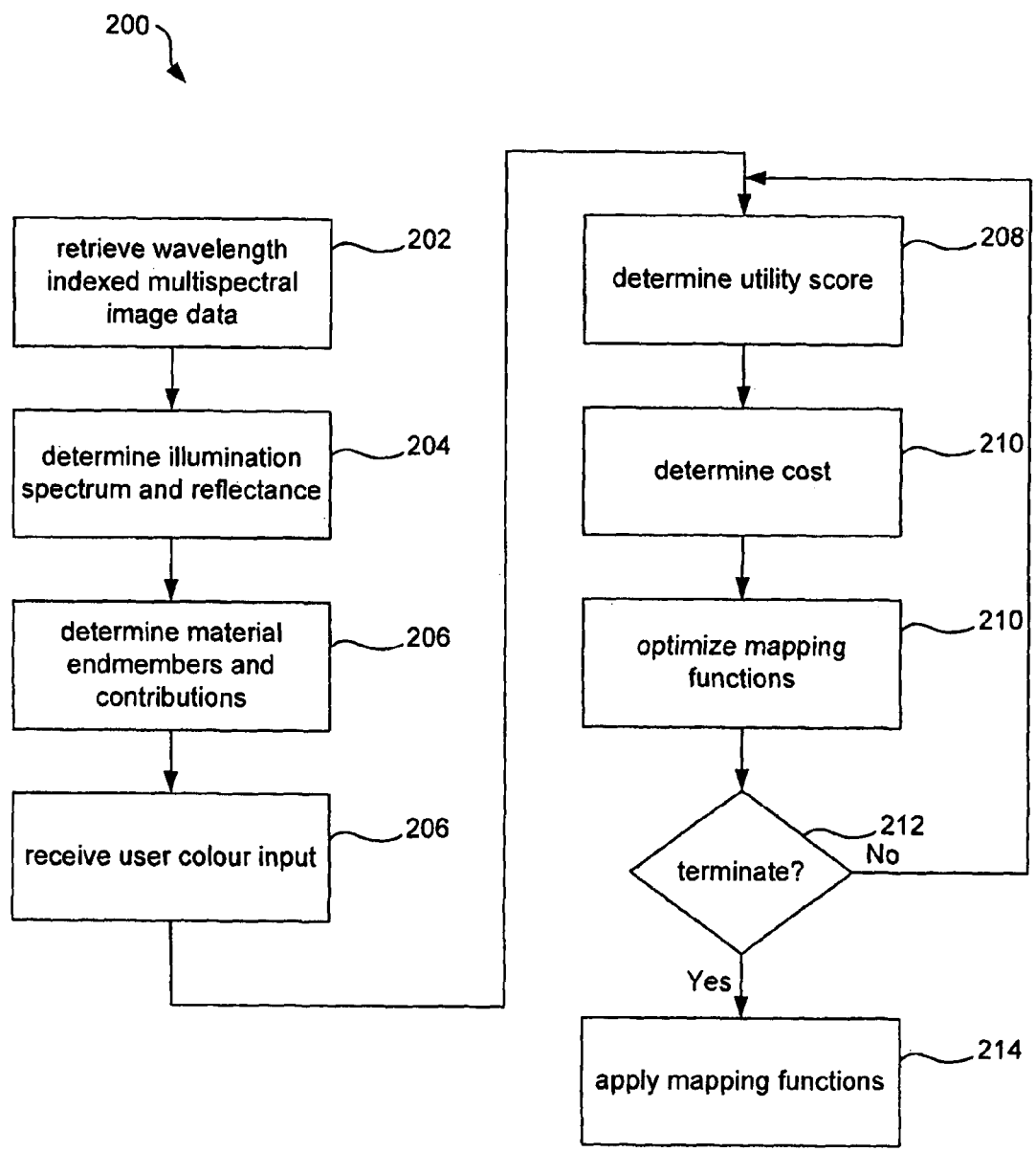
FIG. 2 illustrates a method for determining a colour profile.

FIG. 2 illustrates a method 200 for determining a colour profile. The first step is to retrieve 202 wavelength indexed hyperspectral or multispectral image data of a scene. In this example, the image data is retrieved from the memory 118(b). In other examples, the image data is received directly from the sensor 112. The image data is represented by pixel location that can be one or more individual pixels and for each pixel the data contains a number of radiance values, one radiance value for each wavelength of the light spectrum. In one example, the light spectrum covers the visible spectrum (430-720 nm). In another example, the light spectrum also covers wavelengths that are not visible to the human eye, such as infrared light (650-990 nm). The different wavelengths may be equally spaced, such as by 10 nm, or may be closer to each other over parts of the spectrum that are more significant for the discrimination of different materials. For instance, the spectrum of Chlorophyll has a distinctive peak in the green light spectrum.

Figure 3:
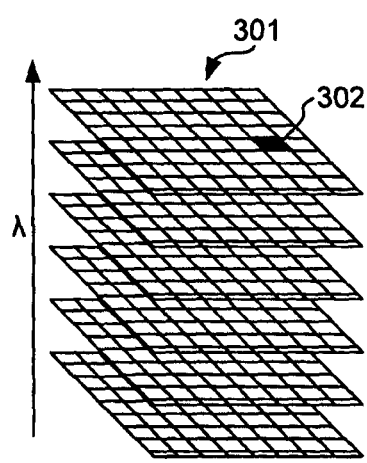
FIG. 3 illustrates a data structure for the multispectral image data.

FIG. 3 illustrates a data structure 301 for the multispectral image data. The data structure comprises layers, one for each wavelength. Each layer represents the radiance values for one wavelength. One pixel 302 is highlighted. The values of pixel 302 for different wavelengths, that is the radiance values from lower layers at the same location as pixel 302, represent a sampled radiance spectrum also referred to as the image spectrum. This image spectrum is a mixture of the illumination spectrum and the reflectance spectra of the different materials present in the part of the scene that is covered by pixel 302. It is noted here that some pixel areas cover only one single material while other pixel areas cover parts of the scene with multiple materials. Further, each material may be a mixture of multiple endmembers.

In one example spectral data is acquired by heterogeneous sensing devices, which vary in spectral resolution and range. For instance, spectrometers acquire hundreds of bands in the visible and infrared regions, whereas hyperspectral and multispectral imagers are limited to a much coarser spectral resolution due to their optical design. In this example, the endmember library is collected by a spectrometer with a high spectral resolution, while the spectral imagery is acquired by a hyperspectral camera with a lower spectral resolution. To overcome this barrier, it is necessary to re-interpolate spectral data originally collected from these different sources so as to provide consistent spectral resolutions and ranges Furthermore, operations such as an object material recovery process require spectra of equal lengths and resolutions. In some examples representations of reflectance spectra include basis functions. These are, in essence, spectral descriptors which allow for the interpolation of spectral data by employing either a B-Spline [4] or a Gaussian Mixture representation [1]. In one example the B-Spline representation is employed to normalise the length and resolution of image and endmember spectra due to its superior performance to the Gaussian Mixture representation for material classification tasks [4].

In order to prepare the data for the later steps, the method 200 determines 204 the illumination spectrum. The method for determining the illumination spectrum is described in WO 2011/026167, which is incorporated herein by reference. This method determines the optical invariants of equation (1) including the illumination spectrum L and object reflectance spectrum S.

Once the reflectance spectrum S is known, the method determines 206 the material or endmember spectra and the respective contributions. The algorithm for endmember extraction is described in Australian application AU 2011211336, which is incorporated herein by reference.

To recover colour imagery dependent on user-defined preferences, the heterogeneous nature of the scene is dealt with by imposing consistency over object materials.

In some examples, there are variations in the actual reflectance of pixels belonging to the same material in the scene. This does not necessarily indicate a change of the object material under consideration rather than small variations in composition. For instance, the spatial variations on the enamel of a mug entirely made of porcelain may result in changes in the endmember association to each pixel and adversely affect the colour finally produced. Hence, it would be rather undesirable to have objects partitioned or fragmented into inconsistent endmembers as the colour image is produced. It is the aim to impose endmember consistency between pixels sharing the same material in the scene using the reflectance spectra obtained by the algorithm in WO 2011/026167. Instead of solving the problem at the pixel level, the problem is extended to material clusters, where the endmember decomposition occurs per material rather than per pixel.

The method 200 imposes consistency of endmember composition by recovering their mixture coefficients for each material from the mean reflectance spectrum of the material. The method 200 assigns a partial membership $P(\omega|v)$ of a material cluster co with mean reflectance $S_\omega(\cdot)$ to each pixel v in the image. Taking the set of all the material clusters $\Omega$ in the scene into account, the recovery of the mixture coefficients comprises two successive optimisation problems. The first problem considers the clustering of image pixels based on their spectral reflectance. Here, the method 200 employs an affinity metric $a(\omega, v)$ to preselect k endmembers per material. This is done using the affinity between the pixel reflectance spectrum $S(\cdot, v)$ and the mean spectrum $S_\omega(\cdot)$ of a material cluster. Mathematically, this affinity measure can be defined by their Euclidean angle $$a(\omega, v) = 1 - \frac{\langle S(\cdot, v), S_\omega(\cdot) \rangle}{\|S(\cdot, v)\| \|S_\omega(\cdot)\|}. \quad (5)$$

With this metric, the first optimisation problem aims to minimise the total expected affinity for the entire image as $$A_{Total} = \sum_{v \in \mathcal{I}, \omega \in \Omega} P(\omega|v) a(\omega, v) \quad (6)$$

subject to the law of total probability $\Sigma_{\omega \in \Omega} P(\omega|v) = 1 \forall u \in \mathcal{I}$.

Since the formulation in equation (6) often favours hard assignment of pixels to their closest materials, the problem is restated subject to the maximum entropy criterion [5]. The entropy of the material association probability distribution at each pixel is defined as $$\mathcal{P} = -\sum_{v \in \mathcal{I}} \sum_{\omega \in \Omega} P(\omega|v) \log P(\omega|v) \quad (7)$$

With the affinity metric in equation (5), the problem becomes that of finding a set of object material spectra and a distribution of material association probabilities $P(\omega, v)$ for each pixel $v$ so as to minimise $$A_{Entropy} = A_{Total} - \mathcal{L},$$
where $$\mathcal{L} = T\mathcal{P} + \sum_{v \in \mathcal{I}} \varrho(v) \left( \sum_{\omega \in \Omega} P(\omega v) - 1 \right) \quad (8)$$

in which $T \geq 0$ and $\varrho(v)$ are Lagrange multipliers. Note that $T$ weighs the level of randomness of the material association probabilities whereas $\varrho(v)$ enforces the total probability constraint for every image pixel $v$.

The optimisation approach to the problem is somewhat similar to an annealing soft-clustering process. At the beginning, this process is initialised assuming all the image pixels are made of the same material. As the method progresses, the set of materials grows. This, in essence, constitutes several "phase transitions", at which new materials arise from the existing ones. This phenomenon is due to the discrepancy in the affinity $a(\omega, v)$ between the pixel reflectance $S(\cdot, v)$ and the material reflectance spectrum $S_\omega(\cdot)$.

The method 200 then derives the optimal set of scene materials so as to minimise the cost function above. The method 200 computes the derivatives of $A_{Entropy}$ with respect to the material reflectance spectrum $\omega(\cdot)$ and equates it to zero, which yields $$S_\omega(\cdot) \propto \sum_{v \in \mathcal{I}} P(\omega|v) \frac{S(\cdot, v)}{\|S(\cdot, v)\|}. \quad (9)$$

In Equation (9), the probability $P(\omega|v)$ is required. To compute this probability, the method 200 employs deterministic annealing. A major advantage of the deterministic annealing approach is that it avoids being attracted to local minima. In addition, deterministic annealing converges faster than stochastic or simulated annealing [6].

The deterministic annealing approach casts the Lagrangian multiplier $T$ as a system temperature. In one example the initial and terminal temperatures for the deterministic annealing were set to 0.02 and 0.00025, respectively. At each phase of the annealing process, where the temperature $T$ is kept constant, the algorithm proceeds as two interleaved minimisation steps so as to arrive at an equilibrium state. These two minimisation steps are performed alternately with respect to the material association probabilities and the end members.

For the recovery of the pixel-to-material association probabilities, the method fixes the material reflectance spectrum $S_\omega(\cdot)$ and seeks for the probability distribution which minimises the cost function $A_{Entropy}$. This is achieved by setting the partial derivative of $A_{Entropy}$ with respect to $P(\omega|v)$ to zero. Since $\Sigma_{\omega \in \Omega} P(\omega|v) = 1$, it can be shown that the optimal material association probability for a fixed material set $\Omega$ is given by the Gibbs distribution $$P(\omega|v) = \frac{\exp\left(\frac{-a(\omega, v)}{T}\right)}{\sum_{\omega' \in \Omega} \exp\left(\frac{-n(\omega', v)}{T}\right)} \forall \omega.v \quad (10)$$

The second problem is concerned with the decomposition of the mean material reflectance spectra into endmember proportions. With the material reflectance $S_\omega(\cdot)$ in hand, the method 200 recovers the endmember proportions $\rho_{m,v}$ contributing to the composition of each material $\omega$. The problem is formulated as a minimisation of the cost function $$\epsilon_\omega = \int_V \left( S_\omega(\lambda) - \sum_{m=1}^{N} \rho_{m,\omega} S_m(\lambda) \right)^2 d\lambda \quad (11)$$

subject to the constraints $\rho_{m,v} \geq 0$ and $\Sigma_{m=1}^{N} \rho_{m,\omega} = 1 \forall \omega \in \Omega$.

The cost function in Equation 10 can be minimised by a least-squares solver. The weight of the endmember $m$ for pixel $v$ is then given by $$\rho_{m,v} = \sum_{\omega \in \Omega} P(\omega|v) \rho_{m,\omega} \quad (12)$$

With the material clusters obtained, the method 200 proceeds to the recovery of the colour values. In one example the user can choose pixels in the image $\mathcal{I}$ which the user would like to edit and assign a colour to the corresponding material. In another example the problem of recovering the relevant user profile becomes that of finding a strategy to update the function $f_c(\cdot)$ for each endmember so as to recover the colours of the materials under consideration. Another part to this problem is to update the function $g_c(\cdot)$ for each illuminant. This update is reflected in the temperature of the light and relates to the colour constancy problem in computer vision.

In a different example the problem is to update the function $\not\!p$, L$\not\!p$(·), $S_m(·)$) from equation (4) for each combination of illumination spectra and endmembers, such as rose petals in daylight. In this example, for four illuminants and 54 endmembers there are 4*54=216 colour mapping functions to determine.

Figure 4A:
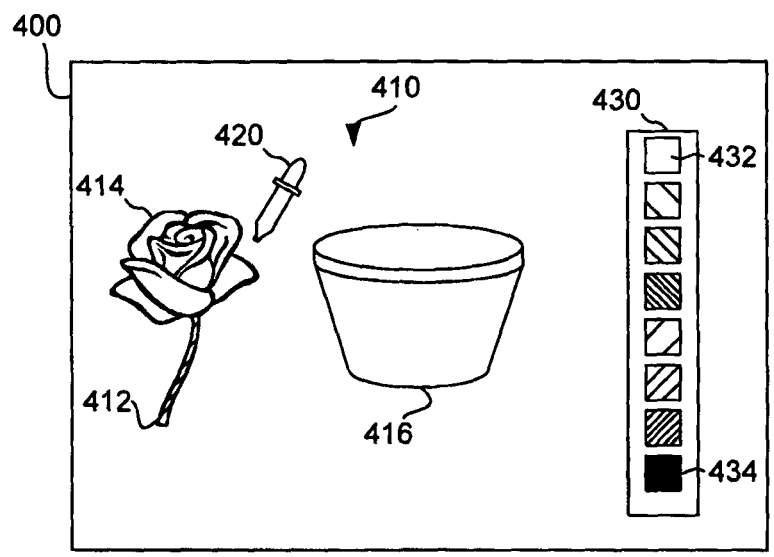
FIGS. 4a and 4b illustrate a graphical user interface.

FIG. 4a illustrates a graphical user interface (GUI) 400 showing a scene 410. The scene 410 comprises a rose 412 having petals 414 and a pot 416. The GUI 400 comprises a colour picker tool 420 and a colour palette 430. In this example a first colour 432 and a second colour 434 are used.

In the scene 410, the petals 414 and the pot 416 both have the same first colour 432 while the material of the petals 414 and the pot 416 are different. In order to display a colour image from the multispectral image data the method initialises a user colour profile with the default human colour matching function studied by Stiles and Burch [8]. This allows the colour $I_c(v)$ to be available at all the pixels. In this example the first colour 432 is red. The user wishes to replace the colour of the petals 414 by a second colour 434. In this example the second colour 434 is blue. The user selects the second colour 434 and then directs the colour picker tool 420 over the petals 414 using an input device, such as a computer mouse or a touch screen. Once the tip of the colour picker tool 420 is located at a location of a pixel belonging to the petals 414, the user selects this pixel by depressing a mouse button, the enter button on a keyboard or tapping the touch screen.

Figure 4B:
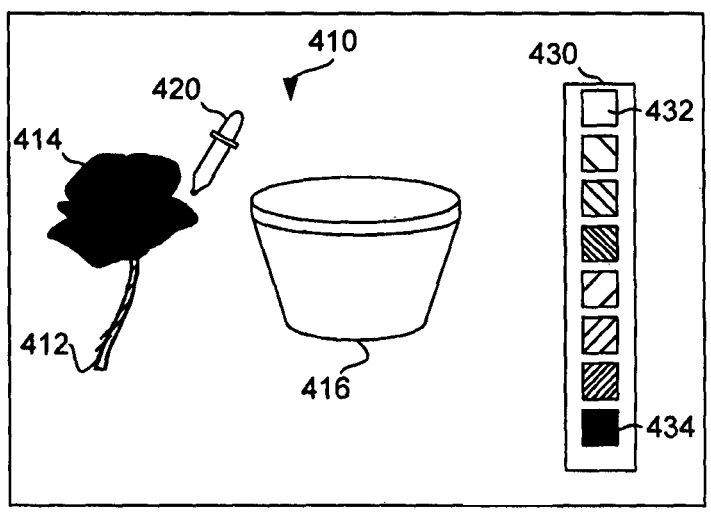

FIG. 4b illustrates the desired outcome after the method 200 has finished. The colour of the petals 414 is now the second colour 434 while the colour of the pot 416 is still the first colour 432. This means, the method 200 has applied the second colour 434 only to the material of the petals 414 and not to the material of the pot 416.

Once a user finishes editing, the system computes the dichromatic model parameters and the proportions of endmembers and updates the colour mapping functions as described later. The application development hinges on the underlying assumption that each user has a particular colour profile. This is in general true, since trichromatic cameras fix the material-colour relationship making use of sensor-dependent colour matching functions. Thus, the proposed method provides a means for the user to create and update a profile or profiles of his/her preferences.

To compute the colour mapping functions from user input, the method 200 requires the user-provided colour at a number of image pixels. In Equation (4) the pixel colour is a linear combination of MN+M terms involving functions $f_c(·)$ and $g_c(·)$. Therefore, to recover, the colour values $C_m$, at least MN+M pixel spectra are required to solve for the endmembers and canonical light sources when the user edits the material colours. The colour picker tool 420 allows the user to edit the colour of a single pixel at a time. Therefore, the system is designed to automatically select more pixels sharing the same material as that of the selected one using a similarity threshold. This similarity measure between two pixels u and v is reminiscent of that used in bilateral filtering, which is given by $$d(u, v) = \exp\left\{-\left(\frac{\angle(S(·,u), S(·,v))}{\sigma_r}\right)^2 - \left(\frac{\|u-v\|}{\sigma_s}\right)^2\right\}$$

where $\angle(S(·,u), S(·,v))$ is the Euclidean angle between the reflectance spectra, $\|u-v\|$ is the spatial distance between u and v, and a $\sigma_r$ and $\sigma_s$ signify the kernel widths in the spectral reflectance and spatial domains.

Once the user has selected a user colour and a particular pixel location the GUI 400 sends this information to the method 200 which receives 206 the information.

A straightforward solution for determining the colour mapping functions would be to solve a linear system of equations so as to recover the colour mapping functions based on, for instance, a least squares criterion. The main drawback of this treatment is that given a set of hyperspectral images, when the user edits the material in, one of them, such an action will change the appearance of the other imagery.

Instead, the method 200 moderates the effect of changes in the colour of library endmembers for the material being edited. This is done using an utility score, such as an aesthetic score, of the rest of the imagery. The idea is to use the aesthetic qualities of some features in the images under study to recover the colour mapping functions such that the material colour is as close as possible to that selected by the user on the image being edited while avoiding changes that would make the colour of the rest of the available images less aesthetically appealing.

In one example the work of Birkhoff is used to further improve the results. In a different example "colourfulness" is used, that is a measure that includes colour contrast. In another example the aesthetic score is a more general utility measure that allows the visualisation to go beyond aesthetics. For example, the utility measure may be about how hazardous, a substance is (red for very dangerous, green for innocuous).

In different examples the utility score is a score based on benefit, profit, added financial or monetary value, enhanced visualisation of multiple images or the nature of the rendering context. This would allow different colour profiles to be added so as to provide the best colour match possible.

In a different example, eight features introduced in [3] are used to relate the update of the colour mapping functions to the aesthetic qualities of the imagery. In [3], the authors classified images in terms of aesthetic quality by obtaining the top 15 out of 56 features which yield the highest classification accuracy. Following this approach, method 200 uses the eight features in their system which operate on HSV values (hue, saturation and value). Since these features are based on the HSV values for the image, they can be expressed in terms of the endmember library making use of a set of image-wise parameters which depend on the mixture coefficients $\rho_{m,v}$. These features are computed as given by the formulae in Table 1.

TABLE 1

Aesthetic features per material in each image.

| | |
|---|---|
| Most abundant material | $\xi_{1,m} = \dfrac{\sum_{v \in I} \rho_{m,v} \delta_{v,1}}{\sum_{v \in I} \delta_{v,1}}$ |
| $2^{nd}$-most abundant material | $\xi_{2,m} = \dfrac{\sum_{v \in I} \rho_{m,v} \delta_{v,2}}{\sum_{v \in I} \delta_{v,2}}$ |
| Rule of Thirds | $\xi_{3,m} = \dfrac{h}{9} \sum_{v \in I_{thirds}} \rho_{m,v}$ |

TABLE 1-continued

Aesthetic features per material in each image.

Whole image average
$$\xi_{4,m} = h \sum_{v \in I} \rho_{m,v}$$

Macro Feature
$$\xi_{5,m} = \frac{\sum_{v \in I_{inner}} \rho_{m,v}}{\sum_{v \in I_{rest}} \rho_{m,v}}$$

It is noted that feature $\xi_{i,m}$ may relate to a specific material or endmember m. The features are computed making use of the mixture coefficients $\rho_{m,v}$ and the function $\delta_{v,i}$ which is unity if and only if the i-th most abundant material in the image has a non-zero mixture coefficient in the composition of the pixel v. Making use of these, features, in one example the method 200 determines the following feature vector: $\phi$
$\mathcal{I}_{,m} = [[\xi_{1,m}\xi_{2,m},\xi_{3,m},\xi_{4,m}\xi_{5,m}] \times S_m, [\xi_{1,m}\xi_{4,m}\xi_{5,m}] \times V_m]^T$
where $S_m$ and $V_m$ are the saturation and the brightness components of the HSV values equivalent to the RGB responses yielded by the colour mapping function $f_c(S_m(\cdot))$ for the endmember m. As a result, there is a close relationship between the colour matching function $f_c(S_m(\cdot))$ and the parameters $S_m$ and $V_m$.

This relationship is significant since the cost function below optimises the aesthetic score. During this optimisation the aesthetic features $\xi_1$ to $\xi_5$ do not change but $S_m$ and $V_m$ are updated to achieve a lower cost. As a result of the close relationship, the colour mapping function $f_c(S_m(\cdot))$ is also updated and the RGB image generated by applying $f_c(S_m(\cdot))$ also changes at each optimisation step. The optimisation procedure will be explained in detail below.

It is noted that the features $\xi_2$ and $\xi_3$ are not present in the second element of the aesthetic score. This makes the computation more efficient with negligible influence on accuracy. In a different example the features $\xi_2$ and $\xi_3$ are also present in the second element of the aesthetic score.

The omission of the hue component from the feature is a direct development from [3] where hue does not appear in the top 15 features as a result of five-fold cross validation. As a result, in this example the optimisation approach leaves the hue to be edited by the user while allowing for variations of saturation and brightness.

One possible interpretation of the above feature vector is as follows. The features in Table 1, from top to bottom, correspond to the weighted average of the two most abundant materials in the image, the rule of thirds (the centre square $\mathcal{I}_{thirds}$ of the image when divided into a lattice of nine regions), the mean image-wise mixture coefficient and the macro weighted average per image. Here, following [3] the macro weighted average is computed by dividing the image into a lattice of 16 regions so as to recover the four centre squares denoted as $\mathcal{I}_{inner}$ and the outer region denoted as $\mathcal{I}_{rest}$ such that $\mathcal{I} = \mathcal{I}_{inner} \cup \mathcal{I}_{rest}$. In the table, h acts as a bandwidth parameter given by the quantity $$\frac{1}{|\mathcal{I}|}.$$

Other exemplary features are abundance of materials in the image, most abundant component, second most abundant component, rule of thirds, whole image average, macro feature, domain knowledge, or rules and regulations pertaining the utility measure;

To express the aesthetics of images in terms of the saturation, the brightness and the mixture coefficients of endmembers, the score $\gamma \mathcal{I}_{,m}$ is defined for each image provided as input to the user. This score is computed making use of the set $\Upsilon$ of images which will be affected in aesthetic terms by the colour mapping function update, although not being edited directly.

In one example the user is editing an image $\mathcal{I}_1$. If $\mathcal{I}_1$ is part of a greater set $\Upsilon$ of images stored, such as on a hard drive, the method will try to compute the profile that best matches the edits by the user while maximising the aesthetic score of the entire imagery $\Upsilon$. The aim is to allow the user to modify the image while preventing frivolous changes to the colour mapping functions. In another example the user edits several images at once. In yet another example hard constraints are imposed on some endmembers not to change or even weights assigned to some of them to control how much these endmembers are modified with respect to their initial values.

In one example the method 200 determines 208 the score of each endmember m in the image $\mathcal{I}$ by using a support vector machine, a linear discriminant, or a logistic regressor.

In another example the method 200 determines 208 the score of each endmember m in the image $\mathcal{I}$ by using a classifier, such as a quadratic discriminant as follows:

$$\gamma \mathcal{I}_{,m} = K_m + \phi \mathcal{I}_{,m}^T W_m + \phi \mathcal{I}_{,m}^T Q_m \phi \mathcal{I}_{,m} \qquad (13)$$

where the matrix $Q_m$, the vector $W_m$ and the constant $K_m$ correspond to the endmember m in the library. These parameters can be recovered making use of quadratic discriminant analysis, which relaxes the constraint that both high and low aesthetic quality image groups have a common covariance structure, as compared to linear discriminant analysis.

The quadratic discriminant analysis, that is the training of the quadratic discriminant model of equation (13) is performed based on the Photo.net database following [3]. Photo.net is an online photo sharing community where each photo has a score that is predetermined by its members rating photos in the database from one to seven, while higher score indicates better aesthetic quality. For the recovery of the matrix $Q_m$, the vector $W_m$ and the scalar $K_m$, features for the photos in the database are extracted and the images are separated into high and low aesthetic quality using a cut-off rating of $$5.0 \pm \frac{t}{2}$$

for the images of high and low aesthetic quality, where t is a parameter chosen by cross validation so as to maximise the accuracy of the quadratic estimator on the Photo.net database.

$Q_m$, $W_m$ and $K_m$ are found by optimising a discriminant function with respect to the top 15 aesthetic features used in [3]. The purpose of this optimisation is to discriminate good and bad looking pictures. The discriminant function relies on RGB features from [3] rather than an endmember database. Therefore, these features are different from the aesthetic score in Table 1. The features used for the classifier are based on the saturation and brightness for the RGB responses, which allows all the training to be done in RGB and the testing to be effected using the RGB values for the endmembers.

Given the aesthetic score of the imagery, method 200 proceeds with the recovery of the colour mapping function for the endmembers in an optimisation setting. The method determines 210 the value of the following cost function:

$$\epsilon_{f_c} = \sum_{I \in Y} \sum_{v \in I} \left( I_c(v) - \sum_{m \in S} \rho_{m,v} f_c(S_m(\cdot)) \right)^2 + \mathcal{T} \sum_{I \in Y} \sum_{m \in S} \exp(-\gamma_{I,m}) \quad (14)$$

The aim is to minimise this cost function. In the above equation, $I_c(v)$ is the value of the c-component at the pixel $v$ as provided by the user while editing the image $\mathcal{I}$. In the example described with reference to FIG. 4a the colour of all pixels is initialised using a default mapping function, such as a profile defined by the CIE standards, and the second sum in equation (14) iterates over all pixels of the image.

In a different example, the colour values of only a subset $\mathcal{J}$ of pixels is available, that is the subset for which the user has specified a colour. In this example the second sum iterates over the subset $\mathcal{J}$ instead of the entire image $\mathcal{I}$.

In yet another example, equation (14) is not expressed in terms of endmembers but in terms of materials. In that example, the contributions $\rho$ are replaced by $P(\omega|v)$ and the endmember spectra $S_m(\cdot)$ are replaced by the material spectra $S_\omega(\cdot)$. Further, the score $\gamma_m$ is determined based on the individual scores of the materials rather than the endmembers.

Since the score $\gamma_m$ is a quadratic function of the material HSV values $S_m$ and $V_m$, the user-provided pixel colour $I_c(v)$ and the mapping $f_c(S_m(\cdot))$ are converted to the HSV colour space.

The user edits the RGB value itself, which is much more natural than editing in the HSV space. The method 200 uses the HSV colour space to compute the aesthetic score used for the optimisation. In equation (14), the method 200 finds the closest RGB colour mapping $f_c(S_m(\cdot))$ for the end members $S_m(\cdot)$ in the image such that the aesthetic score is maximised. The score itself is computed using the features in HSV, but this is not a problem since equation (14) uses the score yielded by the classifier in equation (13), not the features themselves.

Furthermore, $\tau$ is a parameter that controls the contribution of the aesthetic score $\gamma_{\mathcal{I},m}$ in the optimisation process. In one example the value of $\tau$ is 5. It is noted that, in the equation above, there is used the exponential as a monotonically decreasing function whose value tends to zero as the score of the imagery increases. This has the effect of penalising choices of $f_c(S_m(\cdot))$ which yield poor aesthetic results. In one example a quasi-Newton method [2] is employed in order to minimise the cost function in equation (14). The quasi-Newton method is an iterative method embedded into method 200. In each step the method 200 determines 210 mapping functions $f_c(S_m(\cdot))$ with lower cost than the current solution.

Method 200 then checks 212 whether a termination condition is met, such as exceeding a maximum number of iterations or staying below a minimum cost difference compared to the previous step. If the termination condition is not met, the method 200 goes back to the step of determining 208 the utility score using the updated mapping functions. If the termination condition is met, the method applies 216 the mapping functions to the image data to generate RGB images from the endmember decompositions applying equation (2) or (4).

The endmember output colour of an image can be used in pre and post processing of the image data.

Processing of the image includes, but is not limited to:
Image editing
  re-illumination, such as colour manipulation to change an image from warm to cold, or change illumination spectrum of an image to change the illumination from daylight to sunlight, or sunlight to tungsten
  re-shading
  re-colouring, for example to change a black and white image to colour based on the properties of a known colour set or colouring the image such that materials for each of the identified hyperplanes are represented by distinctive colours
  material modification
  highlight removal
  surface rendering
  material modification
Material recognition or classification
  material, pattern or object recognition and classification
Hardware calibration
  improve photometric calibration, such as that of sensor 112 that captured the image The method for determining an output colour value for a component of a decomposed multispectral or hyperspectral image may be directly implemented in hardware, such as an application specific integrated circuit or a field programmable gate array. This hardware may even be integrated with the sensor 112 into a single integrated circuit.

Applications of the methods described here include to the fields of:
  digital photography, such as image editing
  manufacturing, such as quality and production control.
  product analysis, such as determining whether a vehicle had been in an accident, and
  surveillance, such as face identification and tracking.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

REFERENCES

[1] E. Angelopoulou, R. Molana, and K. Daniilidis. Multi-spectral skin color modeling. In Computer Vision and Pattern Recognition, pages 635-642, 2001.

[2] J. Bonnans, J. C. Gilbert, C. Lemarechal, and C. Sagastizabal. Numerical Optimization-Theoretical and Practical Aspects. Universitext. Springer Verlag, Berlin, 2006.

[3] R. Datta, D. Joshi, J. Li, and J. Z. Wang. Studying aesthetics in photographic images using a computational approach. In European Conference on Computer Vision, pages 111:288-301, 2006.

[4] C. P. Huynh and A. Robles-Kelly. A nurbs-based spectral reflectance descriptor with applications in computer vision and pattern recognition. In IEEE Conference on Computer Vision and Pattern Recognition, 2008.

[5] E. T. Jaynes. Information Theory and Statistical Mechanics. Phys. Rev., 106(4):620-630, 1957.

[6] S. Kirkpatrick, C. D. Gelatt, and M. P. Vecchi. Optimization by simulated annealing. Science, 220(4598):671-680, 1983.

[7] S. A. Shafer. Using color to separate reflection components. Color Research and Applications, 10(4):210-218, 1985.

[8] W. S. Stiles and J. M. Burch. N.P.L. colour-matching investigation: Final report 1958. Optica Acta, 6:1-26, 1959.

The invention claimed is:

1. A computer implemented method for converting a hyperspectral image into a color image, the method comprising:
receiving wavelength indexed hyperspectral image data captured by a hyperspectral sensor and decomposed into multiple component spectra, such that a mixture of the multiple component spectra forms the hyperspectral image data;
determining or accessing a first color value for each of the multiple component spectra;
receiving from a user, user input color value for a pixel location in the image, wherein one or more of the multiple component spectra contributes to the pixel according to the mixture;
determining the output color value for each of the one or more multiple component spectra by minimizing a difference between the user input color value and a pixel color value, the pixel color value based on the first color value for the one or more multiple component spectra according to the mixture and minimising the difference is based on a utility score;
creating a color image by determining for each pixel of the color image the pixel color value by mixing for each pixel the output color value for each of the one or more multiple component spectra according to the mixture; and
storing the color image on a datastore.

2. The computer implemented method of claim 1, wherein determining the output color value comprises optimising a cost function.

3. The computer implemented method of claim 2, wherein the method comprises determining or accessing a component contribution for the pixel location and the cost function is based on the component contribution.

4. The computer implemented method of claim 2, wherein the cost function is based on a utility score for each component spectrum.

5. The computer implemented method of claim 1, wherein the image is decomposed into material spectra and the component spectrum is one of the material spectra.

6. The computer implemented method of claim 5, wherein the method comprises:
determining or accessing a decomposition of the material spectra into endmember spectra; and
determining an output color value for each endmember spectrum based on the output color value for the material spectrum.

7. The computer implemented method of claim 1, wherein the image is decomposed into endmember spectra and the component spectrum is one of the endmember spectra.

8. The computer implemented method of claim 1, wherein the method is performed, such that an output color value for each component spectrum represented in the image is determined.

9. The computer implemented method of claim 1, wherein the utility score is any one or more of:
an aesthetic score;
a score based on a predetermined scale of danger, benefit, profit or added financial or monetary value;
enhanced visualisation of multiple images; or
the nature of the rendering context.

10. The computer implemented method of claim 1, wherein the utility score is based on a classifier.

11. The computer implemented method of claim 10, wherein the classifier is any one or more of:
a quadratic discriminant;
a support vector machine;
a linear discriminant; or
a logistic regressor.

12. The computer implemented method of claim 10, wherein the classifier is based on one or more of:
abundance of material spectra in the image;
most abundant component spectrum;
second most abundant component spectrum;
rule of thirds;
whole image average;
macro feature;
domain knowledge; or
rules and regulations pertaining the utility measure.

13. The computer implemented method of claim 1, wherein the utility score is based on the contrast of the image.

14. The computer implemented method of claim 1, wherein the utility score is based on the hazardousness of the component spectrum.

15. The computer implemented method of claim 1, wherein the method comprises accessing a library of component spectra.

16. The computer implemented method of claim 1, wherein the method comprises determining or accessing illuminant spectra and illuminant contributions.

17. The computer implemented method of claim 16, wherein the method comprises determining a color value for each illuminant spectrum.

18. The computer implemented method of claim 16, wherein the method comprises determining a color value for each combination of component spectra and illuminant spectra.

19. The computer implemented method of claim 1, wherein the method comprises displaying to a user the color image.

20. The computer implemented method of claim 1, wherein the method comprises initializing the first color value for the component spectrum with a default color.

21. A non-transitory computer readable medium with an executable program stored thereon that when executed causes a computer to perform the method of claim 1.

22. A computer system for converting a hyperspectral image into a color image, the system comprising:
- a port for receiving wavelength indexed hyperspectral image data captured by a hyperspectral sensor and decomposed into multiple component spectra, such that a mixture of the multiple component spectra forms the hyperspectral image data;
- a processor to determine or access a first color value for each of the multiple component spectra, receive from a user, a user input colour value for a pixel location in the image wherein one or more of the multiple component spectra contributes to the pixel according to the mixture, determine the output color value for each of the one or more multiple component spectra by minimising a difference between the user input color value and a pixel color value, the pixel color value based on the first color value for the one or more multiple component spectra according to the mixture and minimising the difference based on a utility score, create a color image by determining for each pixel of the color image the pixel color value by mixing for each pixel the output color value for each of the one or more multiple component spectra according to the mixture, and store a color image including the pixel color value on a datastore.

23. The computer system of claim 22, wherein the computer system comprises a storage to store the image data, the component spectra and the color image.

* * * * *